July 14, 1953 — O. W. ZIELASKOWSKI — 2,645,015
DEVICE FOR TAKING INSEAM MEASUREMENT OF TROUSERS
Filed Feb. 18, 1952 — 2 Sheets-Sheet 1
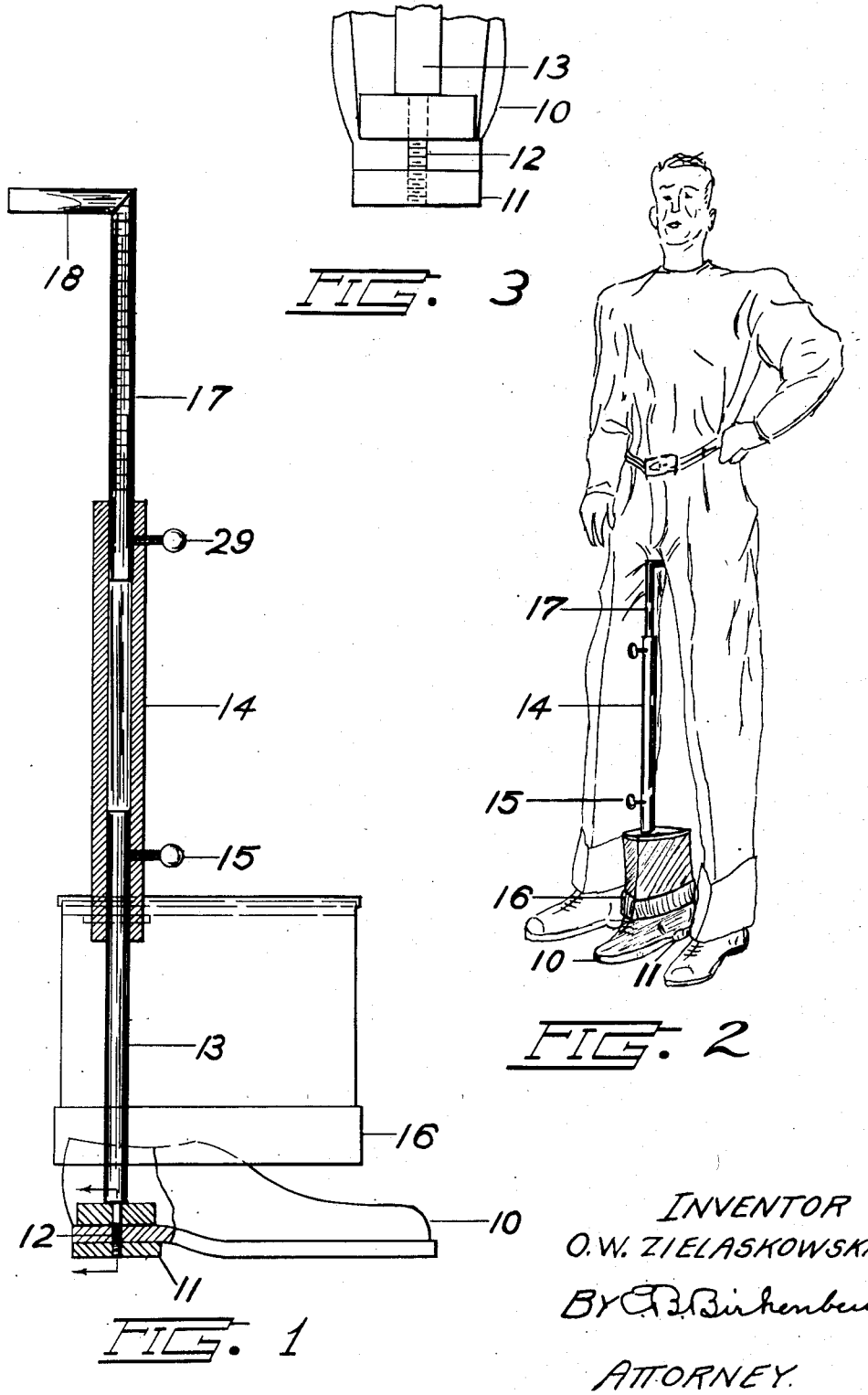
INVENTOR
O. W. ZIELASKOWSKI.
BY C. B. Birkenbeul.
ATTORNEY.

July 14, 1953   O. W. ZIELASKOWSKI   2,645,015
DEVICE FOR TAKING INSEAM MEASUREMENT OF TROUSERS
Filed Feb. 18, 1952   2 Sheets-Sheet 2
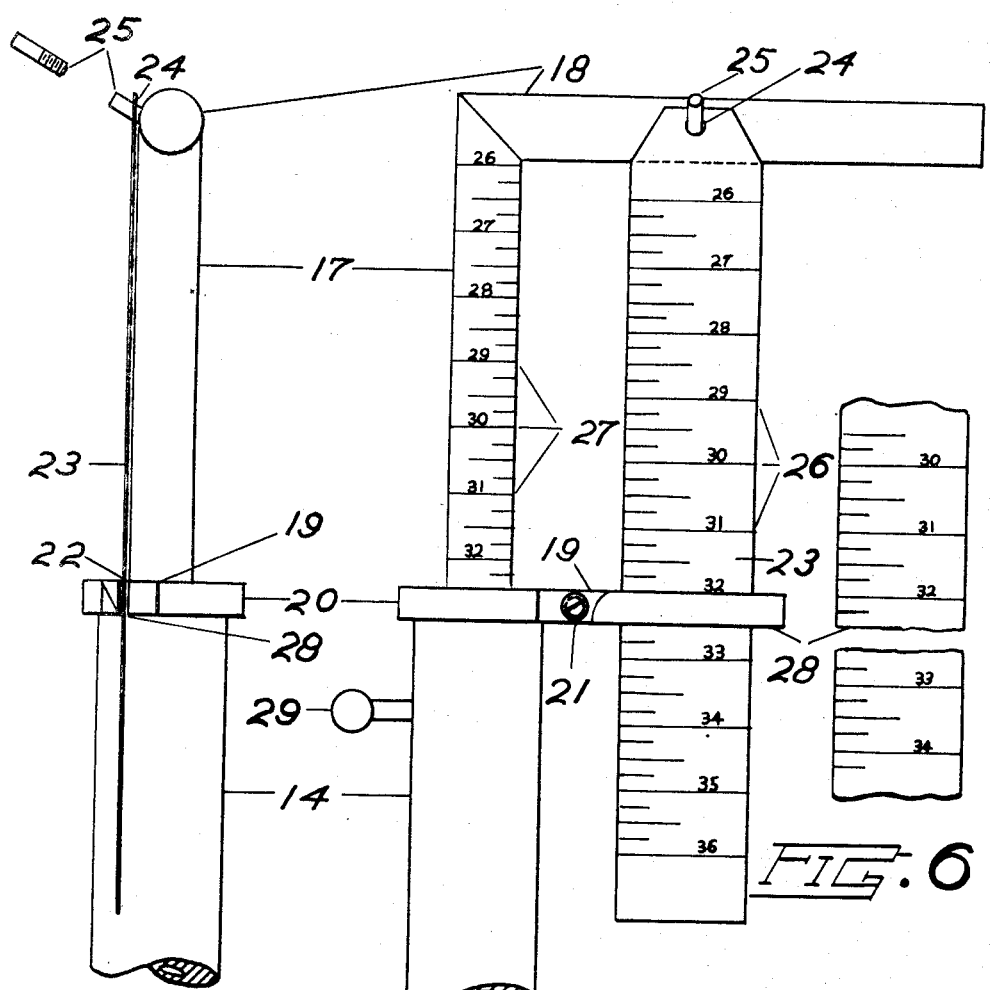
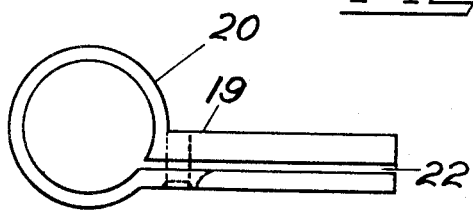
INVENTOR
O. W. ZIELASKOWSKI.
BY E. B. Birkenhead.
ATTORNEY.

Patented July 14, 1953

2,645,015

UNITED STATES PATENT OFFICE 2,645,015

DEVICE FOR TAKING INSEAM MEASUREMENT OF TROUSERS

Orville W. Zielaskowski, Corvallis, Oreg.

Application February 18, 1952, Serial No. 272,087

3 Claims. (Cl. 33—8)

1

This invention relates generally to the tailor's art and particularly to a device for taking inseam measurement of trousers.

The main object of this invention is to provide a simple and accurate means for taking the inseam measurements of trousers.

The second object is to make it possible for the customer to see the position of the cuff when an inseam measurement is taken.

A further object is to provide an automatic means for registering an inseam measurement on the alteration ticket.

I accomplish these and other objects in the manner set forth in the following specification as illustrated in the accompanying drawings, in which Fig. 1 is a side elevation of the device with the telescopic tube in longitudinal section.

Fig. 2 is a perspective view showing the device in use.

Fig. 3 is a fragmentary rear elevation of the heel portion of the device.

Fig. 4 is a fragmentary side elevation showing the automatic registering device.

Fig. 5 is a side elevation of Fig. 4 showing the measurement indicating strip in place.

Fig. 6 is a fragmentary view showing the torn portion of the measuring tape.

Fig. 7 is a plan of the arm used in supporting the measurement recording tape.

Like numbers of reference refer to the same or similar parts throughout the several views.

Referring in detail to the drawings, there is shown a shoe 10 through whose heel 11 extends the threaded end 12 of a rod 13 which is slidably mounted in a tube 14, in which it may be clamped by means of a thumbscrew 15. To the lower end of the tube 14 is attached the replica of a trouser's cuff 16 which, by this arrangement, can be elevated to the desired height above the floor line by merely adjusting the screw 15.

In the upper end of the tube 14 is disposed a rod 17 which is calibrated in inches, in this instance starting at the under side of its horizontal head 18 at the 26" mark and running down to the 36" mark. The head 18 is intended to be placed at the crotch of the trousers when a measurement is taken.

In Figs. 5 and 6 is shown an additional feature, which may be employed to secure a record of the measurement, which record is automatically shown on the alteration ticket. It consists of a slotted arm 19 having a tube encircling band 20 at one end and a clamping screw 21 which holds the arm 19 without completely closing the slot 22 into which is inserted a paper tape 23 whose perforated upper end 24 is suspended from a pin 25 in the head 18. It will be noted that the calibrations 26 on the tape 23 are somewhat lower than

2 the calibrations 27 on the rod 17. This is due to the fact that the inches on the rod 17 are read at the top of the tube 14 while the lower end of the tape 23 is torn off at the under side of the arm 19 along the line 28, as shown in Fig. 6.

To use the device, the customer would indicate the height at which he desires to have the cuff hang. The cuff 16 would then be adjusted to this height by means of the screw 15. The rod 17 would then be raised or lowered until the head 18 registers with the crotch of the customer and the screw tightened and the reading taken at the top of the tube 14 or recorded by tearing the tape 23 along the bottom of the arm 19, thereby giving a visible indication of the measurement as well as making a record on the alteration slip. The position of the rod 17 is fixed in the tube 14 by means of the upper thumbscrew 29.

I claim:

1. An inseam measuring device having in combination a floor engaging shoe, a rod secured to said shoe and extending upwardly from the heel thereof, a tube slidable on said rod having means for clamping it thereto, a replica of a trousers cuff supported by said tube, and a calibrated rod slidably mounted in the upper end of said tube having clamping means therefor and having the upper end of said calibrated rod turned laterally to form a crotch engaging head.

2. An inseam measuring device having in combination a floor engaging shoe, an upright rod secured to the heel of said shoe, a tube slidable on said rod having means for fixing its position thereon, a cuff attached to said tube, a calibrated rod slidably mounted in the upper end of said tube having a laterally turned end constituting a crotch engaging head, a slotted arm projecting from said tube and a hook on said head upon which an elongated calibrated tag may be hung while its lower end extends through said slotted arm.

3. An inseam measuring device having in combination a floor engaging shoe, an upright rod rigidly attached to said shoe, a tube slidably mounted on said rod, a cuff suspended from said tube, a calibrated rod slidably mounted in said tube, said calibrated rod having a crotch engaging head at its upper end, and means for fixing the relation between said cuff and shoe and between said cuff and crotch of the customer.

ORVILLE W. ZIELASKOWSKI.

References Cited in the file of this patent

UNITED STATES PATENTS

| Number | Name | Date |
|---|---|---|
| 2,112,928 | Shulman et al. | Apr. 5, 1938 |
| 2,122,068 | Meyers | June 28, 1938 |
| 2,125,530 | Verdier | Aug. 2, 1938 |